United States Patent

[11] 3,554,374

[72] Inventors Roy C. Blair;
　　　　　　　　Lawrence E. Pohl, Los Gatos, Calif.
[21] Appl. No. 741,959
[22] Filed July 2, 1968
[45] Patented Jan. 12, 1971
[73] Assignee The United States of America as represented by the United States Atomic Energy Commission

[54] PLUGGING COMPOUND COLLECTOR
　　　9 Claims, 4 Drawing Figs.
[52] U.S. Cl. ................................................ 210/85, 210/439, 210/440
[51] Int. Cl. ................................................ B01d 25/16
[50] Field of Search ................................................ 210/85, 305, 439, 440, 450, 488, 498

[56] References Cited
UNITED STATES PATENTS

| | | | |
|---|---|---|---|
| 1,964,218 | 6/1934 | Schargorodsky | 210/488X |
| 2,583,423 | 1/1952 | Hallinan | 210/488X |
| 3,221,882 | 12/1965 | Frantz | 210/488X |
| 3,342,339 | 9/1967 | Riolo | 210/440X |
| 3,361,261 | 1/1968 | Fairey et al. | 210/450X |
| 3,397,794 | 8/1968 | Toth et al. | 210/498X |

Primary Examiner—Samih N. Zaharna
Attorney—Roland A. Anderson

ABSTRACT: A device for selectively extracting impurities from sodium coolant for subsequent analysis, identification and/or disposal. This is accomplished by arranging a battery of demountable, narrow sodium flow passages in a system where sodium temperature can be controlled. As sodium temperature decreases, any impurity will precipitate and collect on the flow passage walls when its equilibrium solubility is exceeded. The demountable arrangement of the device allows easy access to the collected material for removal and identification or disposal.

3,554,374
PATENTED JAN 12 1971
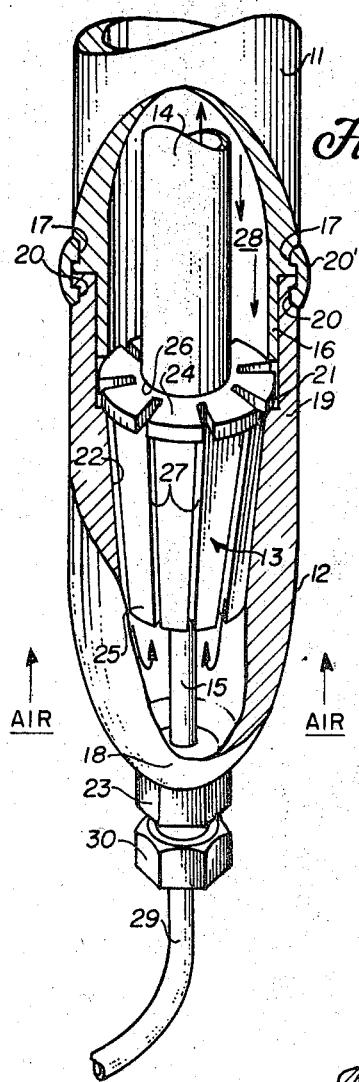
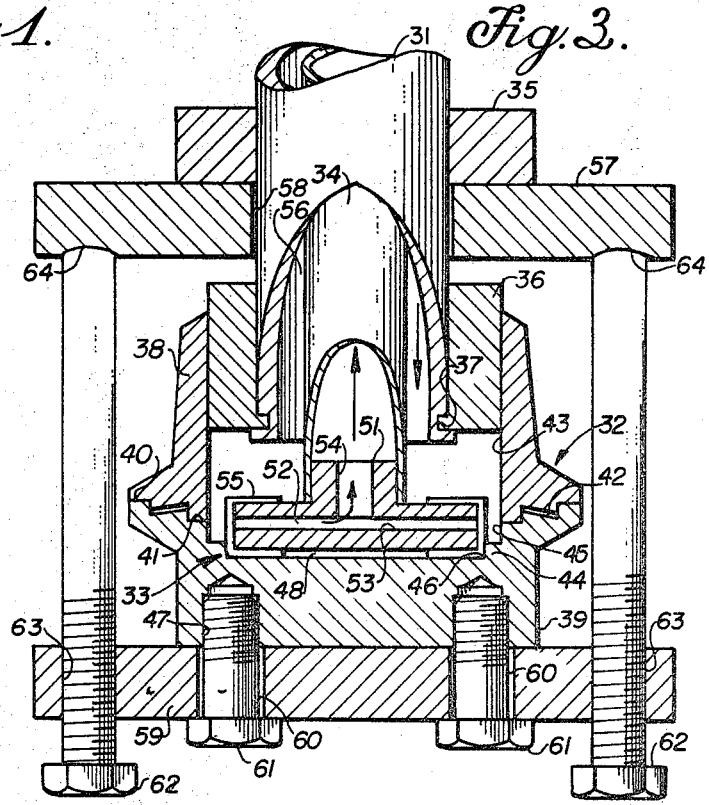
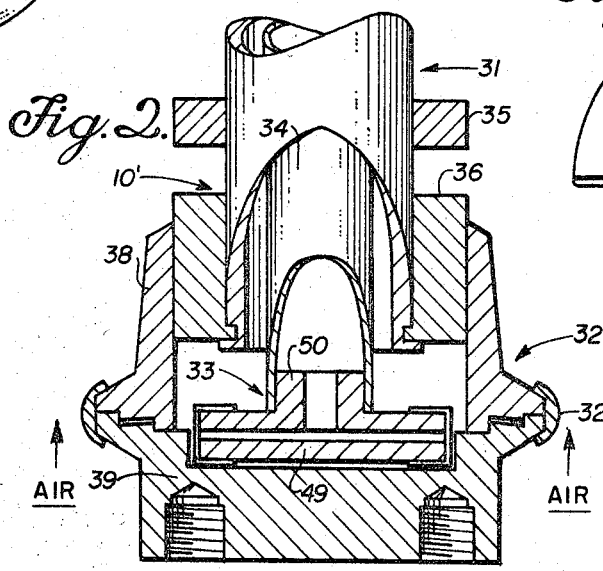
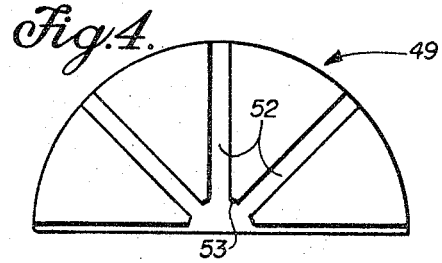
INVENTORS
ROY C. BLAIR
LAWRENCE E. POHL
BY
*Roland A. Anderson*
ATTORNEY

PLUGGING COMPOUND COLLECTOR

BACKGROUND OF THE INVENTION

The invention described herein was made in the course of, or under, AEC Contract No. AT(04-3)-189,Project Agreement No. 15,with the United States Atomic Energy Commission.

The use of liquid metals as heat transfer media in nuclear reactor systems presents problems in corrosion and mass transfer peculiar to these systems. Successful application of liquid metals as coolants will depend on the discovery and elucidation of the basic processes of corrosion and mass transfer and the development of means of controlling these processes. As a result, a great deal of interest in process control by coolant chemistry control has been generated. Basic to this objective is the discovery of many complex interactions between the coolant including its impurities and the system structural materials. Unfortunately, the only concrete success experienced to date toward this objective has been in the control of corrosion rate by control of coolant oxygen content.

It is well known that corrosion rates in many liquid metals are greatly accelerated by the presence of oxygen. This is particularly true of the corrosion of steel reactor systems utilizing sodium or NaK as a coolant. The exact nature of the part oxygen plays in the corrosion process is not known; however, considerable success has been experienced in developing means of monitoring and controlling oxygen levels in sodium and NaK. The oxygen level is controlled by the cold trap and monitored by a plugging indicator in sodium-cooled reactors. Both devices depend of a flow of liquid metal at some temperature, at or below the saturation temperature of oxide in the coolant. The existence of other impurities in the coolant at levels which would produce saturated conditions that would coincide with that of the oxygen level would not impair the effectiveness of the cold trap. However, the performance of the plugging indicator might suffer considerably.

The plugging indicator, as known in the art, is inherently a device for determination of plugging potential of a system and, consequently, is subject to interference from other impurities which precipitate in the measured temperature range. The plugging indicators currently used in many systems for studying corrosion and mass transfer processes are experiencing considerable interference due to multiple breaks in the recorder trace of the flow. This results from effects of unidentified materials precipitating over the temperature range corresponding to the saturation temperature of the oxygen levels employed. The purpose of this invention, referred to herein as a plugging compound collector, is to selectively collect precipitating impurities in sufficient quantities to allow identification by current analytical methods or to filter out such impurities after their identity is known.

The equilibrium solubilities of many impurities in sodium as a function of temperature is well known. Most sodium-cooled systems are operated with a sodium oxide content equivalent to a saturated condition between 120 to 235° C. (5to 50 ppm). As a result, when the sodium is cooled to this range to determine oxide content by plug, any other impurity which has a limited solubility (for example, $Na_2CO_3$ or NaH) could also precipitate if present in sufficient quantities.

During operation of liquid sodium loops at temperatures to and exceeding approximately 700° F., an "as-yet" unidentified material or materials, hereinafter referred to as "Agent X," forms which precipitates out in cooler regions of the loop. This can take place, for example, when a bypass stream of loop sodium is passed through a cooler (such as when flowing through a plugging indicator or a cold trap). When the sodium reaches a certain lower temperature, evidently the saturation of "Agent X" material, precipitation of this material results. This can be detected by observing the decrease in the bypass flow as determined with a magnetic flowmeter connected to a recorder. The precipitation of "Agent X" material has been observed to occur in the loop plugging indicator at temperatures ranging from about 400° F. to over 700° F., depending upon such factors as the maximum loop temperature and the amount of cold trapping activity.

"Agent X" needs to be collected and identified, and measures instituted to control or eliminate it from the sodium loops operating at practical fast reactor coolant temperatures. Several reasons for this are as follows:

1. "Agent X" renders the plugging indicator inoperable as an oxygen meter. It does this by its by its dominating influence on the flow through the plugging indicator, thus obscuring the interpretation of the flow change associated with the saturation temperatures of sodium oxide alone.

2. "Agent X" will be a nuisance in sodium loops (e.g. reactor loops) by interfering with the proper operation of many components with slip fits, by plugging close clearance leaks, or by blocking flow in thin, annular, coolant flow channels.

3. "Agent X" may well be involved in the mass transfer corrosion phenomenon.

SUMMARY OF THE INVENTION

The present invention provides a means for collecting "Agent X" in form and sufficient quantity to analyze and identify it or dispose of it after identification. The apparatus is sample in construction and operation, reusable, and can be easily disassembled in an inert atmosphere, a prerequisite for noncontamination of the sample by ordinary atmosphere. The inventive device meets three main criteria: (1) it simulates the normal flow patterns observed for a loop's plugging indicator; (2) the volume of the orifices is much larger than those in the normal plugging indicator to collect considerably more precipitating material; and (3) the orifices are readily exposed for sampling or removal of the deposited material.

The inventive plugging compound collector is operated concurrent with the plugging indicator during analysis and identification operations. The plugging indicator provides details of temperatures and flow alternations associated with the precipitating materials. Once the plugging temperature for unknown species ("Agent X") has been established, the compound collector is operated at that temperature until partial or full attenuation of flow indicates sufficient material for analysis has been collected.

During operation of the inventive device, sodium flowing down the inlet passage thereof is cooled by air passing up the outer surface. Sodium entering flutes or slots of a collector assembly is cooled to a temperature which promotes precipitation of the unknown species ("Agent X") of interest. The precipitating material collects on the walls of the flutes or slots. Sodium leaving the collector assembly is directed up an exit tube and out of the system. Temperature of the sodium passing through the flutes or slots is monitored by an immersion thermocouple positioned at the midpoint of the collector assembly sodium exit passage. Thus, the inventive concept may function for impurity identification and/or for impurity filtering.

Therefore, it is an object of this invention to provide means for selectively extracting impurities from liquid metal-cooled systems.

A further object of the invention is to provide a means for extracting impurities from liquid metal for subsequent analysis and identification.

Another object of the invention is to provide means for collecting plugging materials in high temperature sodium-cooled systems.

Another object of the invention is to provide an apparatus for concentrating and collecting for analysis or disposal, precipitating sodium impurities in an operating sodium-cooled system.

Another object of the invention is to provide a plugging compound collector for concentrating and collecting impurities other than sodium oxide from the sodium coolant of a reactor operating at temperature ranges from about 400° F. to 700° F.

Another object of the invention is to provide a plugging compound collector which is simple in construction and operation, while being reusable and easily disassembled.

Another object of the invention is to provide a compound collector which functions as an impurity filter when operated under prescribed conditions.

Other objects of the invention will become readily apparent from the following description taken with the accompanying drawings wherein:

BRIEF DESCRIPTION OF THE DRAWINGS

FIG. 1 is a view, partially in cross section, of an embodiment of the invention;

FIG. 2 is a partial cross-sectional view of another embodiment of the invention;

FIG. 3 is a view, partially in cross section, of the FIG. 2 embodiment, and illustrating the disassembly mechanism therefor; and FIG. 4 is a plan view of a portion of the collector plate of the FIG. 2 embodiment.

DESCRIPTION OF THE EMBODIMENTS

The plugging compound collector embodiment illustrated in FIG. 1, and indicated generally at 10, consists of five primary parts; namely, a sodium inlet tube 11, a housing or nose piece 12, a collector assembly 13, a sodium outlet or exit tube 14, and a temperature indicating means composed of an immersion type thermocouple 15.

The inlet tube 11 may, for example, be constructed of stainless steel or other material compatible with the liquid metal coolant therein, which in this embodiment is sodium. Inlet tube 11 is provided at one end with a reduced diameter end portion 16 and is attached at the opposite end (not shown) to the system in which it is utilized and which does not constitute a part of this invention, and thus a detailed description and illustration thereof is deemed unnecessary. Adjacent the reduced diameter portion 16, tube 11 is provided with an external annular groove 17.

The housing or nose piece 12 is of nickel construction, but may be made of other suitable material, and is provided with a contoured nose section 18 for streamlined flow of cooling air thereabout, as will be described hereinbelow. Nose piece 12 is provided with a flanged end portion 19 which is provided with an annular external groove 20 adjacent the end thereof. A section of flanged portion 19 of nose piece 12 encompasses the reduced diameter portion 16 of inlet tube 11 and is secured to the inlet tube by an expandable ring or clip 20' which fits into grooves 17 and 20, thus forming the outer shell of the plugging compound collector. The cavity in nose piece 12 is composed of a cylindrical section 21, formed by flanged portion 19, and a conical section 22. At the contoured nose section 18, nose piece 12 is provided with an aperture (not shown), through which the immersion thermocouple 15 extends, and an externally threaded protruding portion (not shown) to which knurled nut 23 is secured, as will be described hereinafter.

The collector assembly 13 is in the form of a thimble, in this embodiment, and is constructed of nickel or other compatible material. Collector assembly 13 is composed of a cylindrical head or rim portion 24 and a frustoconical configured body portion 25 and is positioned in the cavity of the nose piece 12 such that the rim-portion 0.030 is located in the cylindrical cavity section 21 and the body portion 25 fits snugly into the conical cavity section 22. Collector assembly 13 is provided with a central aperture or opening 26 and a plurality of flutes or grooves 27 (8 being shown in this embodiment). The grooves or flutes 27 are formed in the outer surface of the assembly 13 such that they are substantially parallel to the assembly axis. For example, with the collector assembly one and one-half inches long, the flutes 27 are 0.027 inch deep and 0.030 inch wide, each flute defining a flow area equal to the plugging indicator plugging plate orifice flow area with which the plugging compound collector is to be associated. It is thus seen that when the collector assembly 13 is position within nose piece 12, the inside surface of the nose piece fits the outside surface of the collector snugly and forms narrow flow passages with the collector flutes.

The outlet or exit tube 14 is inserted into the central aperture 26 in the collector assembly 13 to form a slip joint therewith to accommodate thermal expansion during operation. Outlet tube 14 extends through inlet tube 11 and forms an inlet flow passage 28 therebetween. Tube 14 like tube 11 is operatively connected at the opposite end (not shown) with the associated system not constituting part of this invention.

Immersion thermocouple 15 is positioned about midpoint in aperture 26 of collector assembly 13 and is secured therein by knurled nut 23 threaded onto the nose piece 12. Leads for thermocouple 15 extend through conduit 29 and are secured thereto via connector mechanism generally indicated at 30, as known in the art.

To assemble the FIG. 1 embodiment, the collector assembly 13 is positioned in housing or nose piece 12, outlet tube 14 is inserted into the central aperture 26 of assembly 13, the inlet tube 11 is concentrically positioned around the outlet tube 14 and secured to nose piece 12 by ring 20', thermocouple 15 is then inserted through nose piece 12 and secured therein by nut 23.

In operation, sodium, or other liquid metal coolant, flowing down the inlet passage 28 as indicated by solid arrows, from the system to which the collector 10 is attached, is cooled by air, as shown by the arrows and legends, passing up the outer surface of the shell (nose piece 12 and inlet tube 11). Sodium entering the flutes 27 of the collector assembly 13 is cooled to a temperature which promotes precipitation of the unknown species ("Agent X") of interest. The precipitating material collects on the walls of the flutes 27. Sodium leaving the flutes is directed up the outlet tube 14, as indicated by dash flow arrows, and out of the plugging compound collector 10. Temperature of the sodium passing through the flutes 27 is monitored by the immersion thermocouple 15 positioned at the midpoint of the collector assembly aperture 26.

As pointed out above, compound collector 10 may be operated concurrent with a plugging indicator (not shown) during analysis and identification applications or operates alone as a filtering mechanism as described hereinafter. The plugging indicator provides details of temperature and flow alternations associated with the precipitating materials. Once the plugging temperature for unknown species ("Agent X") has been established the compound collector 10 is operated at that temperature, by controlling the air flow thereabout, until partial attenuation of flow (which may be about 10 percent) indicates sufficient material for analysis has been collected. Once the temperature has been determined, the compound collector may operate as a filter for collecting impurities which precipitate out at the specific temperature utilized.

Removal of the precipitated material is accomplished by removing the compound collector 10 from the system, then removing the thermocouple 15 and, in an inert atmosphere, disassemblying the compound collector 10 by reversing the assembly procedure described above. Most of the residual sodium is removed mechanically and the collector assembly 13 is then pushed free of the cavity of nose piece 12. The filled flutes 27 are thus exposed and the material removed therefrom for analysis or disposal. The compound collector 10 is then cleaned and reassembled for attachment to the system for further operation.

Tests have shown that the plugging compound collector 10 of FIG. 1 successfully simulated the flow characteristics of the plugging indicator associated therewith and collected the desired unknown species ("Agent X") in sufficient quantities for analysis. Since the details of the analyses of the impurities collected do not constitute part of this invention, further description thereof is deemed unnecessary.

While the outer shell (nose piece 12 and inlet tube 11) of the FIG. 1 embodiment have been shown as being interconnected by an expandable ring or clip, other securing means, including welding may be utilized provided such securing means may be readily removed for disassembly of the plugging compound collector 10.

Referring now to the embodiment of the invention illustrated in FIGS. 2—4, the plugging compound collector indicated generally at 10' differs from the FIG. 1 embodiment primarily in the construction of the collector assembly and manner of disassembly, which eliminates the possible sticking of the FIG. 1 collector assembly to the internal surface of the nose piece or housing thereof. FIG. 2 illustrates this embodiment in its operative condition, while FIG. 3, though enlarged, illustrates the disassembly mechanism therefor positioned thereabout.

The FIG. 2 embodiment is also composed generally of five main parts; namely, an inlet tube or pipe 31, a housing or flange assembly 32, a collector assembly 33, an outlet tube or conduit 34, and an immersion thermocouple (not shown). As in the FIG. 1 embodiment the ends (not shown) of each of the inlet and outlet tubes 31 and 34 are operatively connected with the system for which impurities of the liquid metal are to be collected for analyzing.

As shown in FIGS. 2 and 3, secured to inlet tube 31, such as by welding, are a collar 35 and a spacer 36. Tube 31 is provided at the end secured to spacer 36 with a reduced diameter and cutaway section 37 (see FIG. 3) to provide for a better weld interconnection. As in the FIG. 1 embodiment the inlet tube 31 may be constructed of stainless steel or other suitable material.

Flange assembly or housing 32 is composed of a pair of flanged members 38 and 39, each being provided with three complementary annular steps or shoulders (see FIG. 3), two of which mate as indicated at 40 and 41 while one forms a gap 42. Flange assembly 32 may be constructed of nickel or other suitable material. Flanged member 38 is provided with an annular cylinder wall 43 therein having a diameter which fits about spacer 36 and is secured thereto such as by welding. Flanged member 39 is provided with an additional step or shoulder 44 which defines an internal cavity of different diameters 45 and 46, diameter 45 being the same as the diameter of the annular cylinder 43 of flanged member 38. In addition flanged member 38 is provided with a pair of threaded holes or bores 47 which extend partially therethrough for attachment of the disassembly mechanism therewith. Positioned in cavity 46 of flanged member 39 is a spacer or washer 48 which serves to support at least a portion of the collector assembly 33. Flanged members 38 and 39 may be interconnected by a removable clamp assembly generally indicated at 32' in FIG. 2.

As more clearly seen in FIGS. 3 and 4, collector assembly 33, which may be constructed of nickel or other compatible material, is composed of a collector or bottom plate 49 and an upper plate 50 having a protruding collar portion 51. Collector plate 49 is provided on the upper surface thereof with a plurality of grooves 52 extending radially outward from an annular center cavity 53 (see FIG. 4). Grooves 52 are of the same depth as cavity 53 and, in this embodiment are eight in number. Upper plate 50 is provided with a central aperture or passage 54 of the same diameter as the center cavity 53 of collector plate 49. Plates 49 and 50 are secured together by means of a plurality of clips 55 which extend over the periphery of the plates, but intermediate grooves 52 so as not to block the grooves. Any desired number of clips 55, such as four, may be utilized, and if desired may be spot welded to the plates 49 and 50 to prevent movement of the clips during operation. Collector plate 49 is supported by spacer 48 located in cavity 46 of flanged member 39.

Outlet tube 34 is secured, such as by welding, around the collar portion 51 of upper plate 50 and extends in a concentric arrangement with respect to inlet tube 31 so as to define an inlet passageway 56 therebetween.

While the immersion thermocouple has not been shown for purposes of clarity in FIGS. 2 and 3, it extends through the lower flanged member 39 and the collector plate 49 midway into the aperture or passageway 54 so that it can function in a manner similar to that described above with respect to thermocouple 15 of the FIG. 1 embodiment.

To assemble the FIG. 2 embodiment, the upper plate 50 of collector assembly 33 is secured to outlet tube 34 by welding as shown by the weld bead in FIG. 3, the upper flanged member 38 of housing or flange assembly 32 is secured to spacer 36, which has been secured to inlet 31, by welding as shown by weld beads, collector plate 49 is secured to upper plate 50 by clips 55 such that grooves 52 form radial passageways therebetween, spacer or washer 48 is positioned in cavity 46 of flanged member 39 after which the flanged members 38 and 39 are mated at shoulders or steps 40 and 41 and secured together by clamp assembly 32' or other means, such as an expandable ring or clip assembly positioned about the external mating portions of the flanged members or by appropriate configuration of the shoulders 40—42, such that leakage between the members 38 and 39 is prevented. If desired spot welding may be utilized for connecting the flanged members. The thus assembled plugging compound collector is attached at the inlet and outlet tube ends (not shown) by appropriate connector means with the system of utilization.

In operation of this embodiment, as shown in FIG. 3 by flow arrows, sodium, or other liquid metal coolant, flowing down the inlet passage 56 from the system to which the collector 10' is attached, is cooled by air, as shown by the arrows, passing up the outer surface of the flange assembly 32 and inlet tube 31. Sodium enters the outer end of the passageways formed by radial grooves 52 of the collector assembly 33 and is cooled to a temperature which promotes precipitation of "Agent X" (the unknown species of interest). The precipitating material collects on the walls of the grooves 52. Sodium leaving the grooves is directed via central cavity 53 and aperture 54 up the outlet tube 34 and returned to the associated system. As pointed out above, the temperature of the sodium passing through the collector assembly 33 is monitored by an immersion thermocouple.

As in the FIG. 1 embodiment described above, the compound collector 10' may be operated in conjunction with a plugging indicator and when the associated apparatus indicates that the desired amount of material ("Agent X") has precipitated out of the coolant, the compound collector is removed from the system for disassembly in an inert atmosphere by the mechanism illustrated in FIG. 3. Also as with the FIG. 1 embodiment, collector 10' may be utilized as an impurity filter.

The compound collector disassembly mechanism is composed of a first plate 57 having a slot 58 therein whereby it can be position intermediate collar 35 and spacer 36 with the inlet tube 31 located in slot 58; a second plate 59 having apertures 60 which align with threaded bores 47 of flanged member 39 is secured to the member 39 by bolts 61; and a pair of threaded bolts 62 which extend through threaded apertures 63 in plate 59 and abut in countersinks 64 in plate 57.

To disassemble the compound collector 10', with the disassembly mechanism positioned as shown in FIG. 3, and supposing that the clamp assembly 32' for flanged members 38 and 39 had been removed, bolts 62 are turned so as to bear against plate 57, and due to the plate 59 being secured to flanged member, pulls the flanged member 39 away from flanged member 38, thus breading the seal therebetween, whereby collector plate 49 can be removed by removing clips 55 and the precipitated "Agent X" in grooves 52 exposed for subsequent analysis or disposal.

The compound collector 10' disassembly mechanism may then be removed, the components of the flange assembly 32 and collector assembly 33 cleaned and reassembled for reattachment to the system for further use.

It is readily seen that the steps or shoulders 40—42 may be constructed so as to mate in a "forced fit" relationship and thus serve as the sealing means for flanged member 38 and 39, thus eliminating the need for external spot welding or retainer clamp or clip means.

It has thus been shown that the present invention greatly advances the state of the art in that:

1. It collects the desired impurities of a liquid metal coolant and keeps them in a noncontaminating manner during transport to the laboratory and during storage until analysis can be undertaken.

2. It is convenient to handle in an inert atmosphere chamber of small size and limited operator access, and can be disassembled without complicated tools or without exposing the sample to contaminating material in order to get at the collected sample.

3. It collects samples of sufficient size to allow accurate analysis by modern chemistry laboratory techniques.

4. It collects samples in a form which can be readily handled by the chemist without altering the character of the collected sample.

5. It collects impurities under prescribed conditions and thus can be utilized as a filtering mechanism for such impurities.

While particular embodiments of the invention have been illustrated and described modifications and changes will become apparent to those skilled in the art, and it is intended to cover in the appended claims all such modifications and changes as comes within the spirit and scope of this invention.

We claim:

1. An apparatus for collecting impurities in liquid metal coolant which precipitate out under prescribed temperature conditions and cause plugging of components in an associated system comprising: An inlet tube means, an outlet tube means, said outlet tube means being positioned within said inlet tube means forming an inlet passageway therebetween, a precipitate collector assembly means, a housing means, and a temperature indicating means, said precipitate collector assembly means being operatively positioned within said housing means, at least a portion of said housing means being removably connected to said inlet tube means, said outlet tube means being operatively connected to a substantially centrally located aperture in said precipitate collector assembly means, said temperature indicating means being operatively connected in said housing means, said precipitate collector assembly means being provided with a plurality of passageways, whereby liquid metal coolant enters said housing means through said inlet passageway and passes through said plurality of passageways of said precipitate collector assembly means into said centrally located aperture thereof and discharges through said outlet tube means in a flow direction opposite to the direction of flow in the inlet passageway, whereby impurities in such liquid metal coolant precipitates onto the walls of said passageways of said precipitate collector assembly means under prescribed temperature conditions thereof thus leaving a deposit of such impurities for subsequent removal and analysis.

2. The apparatus defined in claim 1, wherein said plurality of passageways of said precipitate collector assembly means are composed of a plurality of longitudinally extending grooves on the external surface of said collector assembly means, said precipitate collector assembly means being positioned in a snug fitting relationship with said housing such that said passageways are formed therebetween.

3. The apparatus defined in claim 1, wherein said plurality of passageways of said precipitate collector assembly means extend radially outward from said centrally located aperture in said precipitate collector assembly means.

4. The apparatus defined in claim 1, wherein said housing means comprises a nose piece open in one end and having a cavity herein, said cavity including a cylindrical portion and a conical portion, said inlet tube means abutting said open end of said nose piece, means for interconnecting said nose piece with said inlet tube means, said precipitate collector assembly means being composed of a cylindrical rim portion and a conical body portion, said collector assembly means being provided with longitudinally extending grooves along said rim and body portions thereof, said collector assembly means being provided with a longitudinally extending central aperture defining said aperture said collector assembly means being snugly positioned in said cavity of said nose piece such that said cylindrical rim portion is located in said cylindrical cavity portion and said conical body portion is located in said conical cavity portion such that said grooves in said collector assembly means cooperate with the nose piece interior surface to define said plurality of passageways, said outlet tube means being positioned within said inlet tube means defining an inlet passageway therebetween, said outlet tube means being connected to said central aperture of said collector assembly means, said temperature indicating means extending through said nose piece and about midway into said central aperture of said collector assembly means.

5. The apparatus defined in claim 4, wherein said interconnecting means comprises a removable cliplike means.

6. The apparatus defined in claim 4, wherein said temperature indicating means is a thermocouple means of the immersion type.

7. The apparatus defined in claim 1, wherein said housing means comprises a pair of flanged members defining a cavity open at one end, one of said flanged members being secured at said open end to said inlet tube means via a spacer means, each of said flanged members being provided with at least one complimentary mating shoulder means, said precipitate collector assembly means including a pair of plate means, one of said plate means being provided on one side thereof with a central cavity and a plurality of radially extending grooves, the other of said plate means being provided with a protruding collarlike portion and having a central aperture extending therethrough thereby defining said aperture, said plate means being secured together by a plurality of clip means such that said radially extending grooves are intermediately located and thus forming said plurality of passageways and said collarlike portion of said other plate means extends outwardly, said outlet tube means being positioned within said inlet tube means defining an inlet passage therebetween, said outlet tube means being connected to said protruding collarlike portion of said other plate means.

8. The apparatus defined in claim 7, wherein said pair of flanged members are each provided with pair of complimentary mating shoulder means and one complimentary shoulder means defining a gap therebetween, the other of said flanged members being provided with another shoulder means adjacent the closed end of said cavity defined by said flanged members thereby causing a portion of said cavity to have a smaller cross-sectional area, said one of said plate means of said collector assembly being partially positioned in said smaller cross-sectional cavity area.

9. The apparatus defined in claim 7, additionally including a disassembly mechanism, said mechanism comprising a collar means secured to said inlet tube means, a first plate means having a slot therein and adapted to be positioned intermediate said collar means and said spacer means wherein said inlet tube means is at least partially positioned in said slot, a second plate means having at least two apertures therein which align with threaded bores in the other of said flanged members, said second plate means being provided with a pair of threaded apertures, bolt means extending through said apertures in said second plate means and threadedly secured in said threaded bores of said other flanged member for securing said second plate means to said other flanged member, and boltlike members threaded through said threaded apertures in said second plate means for abutment against said first plate means, whereby movement of said boltlike members through said second plate means causes said first plate means to abut against said collar means whereby further movement of said boltlike members causes said second plate means to move away from said first plate means thereby separating said flanged members due to said other flanged member being secured to said second plate means, thus providing access to said collector assembly means for separation of the plate means thereof which provides access to any deposit of impurities in said grooves of said one plate means.